(12) United States Patent
Samuels et al.

(10) Patent No.: US 8,919,000 B2
(45) Date of Patent: Dec. 30, 2014

(54) LOW VELOCITY PROJECTILE AIMING DEVICE

(71) Applicants: Mark A. Samuels, Johns Creek, GA (US); Richard L. Fowler, Dacula, GA (US)

(72) Inventors: Mark A. Samuels, Johns Creek, GA (US); Richard L. Fowler, Dacula, GA (US)

( * ) Notice: Subject to any disclaimer, the term of this patent is extended or adjusted under 35 U.S.C. 154(b) by 0 days.

(21) Appl. No.: 13/674,693

(22) Filed: Nov. 12, 2012

(65) Prior Publication Data

US 2014/0331985 A1 Nov. 13, 2014

Related U.S. Application Data

(63) Continuation of application No. 12/826,391, filed on Jun. 29, 2010, now Pat. No. 8,336,216.

(51) Int. Cl.
*F41G 1/467* (2006.01)

(52) U.S. Cl.
USPC .............................................. 33/265; 124/87

(58) Field of Classification Search
USPC ............................................................ 33/265
See application file for complete search history.

(56) References Cited

U.S. PATENT DOCUMENTS

| | | | | |
|---|---|---|---|---|
| 2,788,701 | A * | 4/1957 | Browning | 33/265 |
| 4,617,741 | A * | 10/1986 | Bordeaux et al. | 33/265 |
| 5,479,712 | A * | 1/1996 | Hargrove et al. | 33/265 |
| 6,366,344 | B1 * | 4/2002 | Lach | 33/265 |
| 6,397,483 | B1 * | 6/2002 | Perkins | 33/265 |
| 7,614,156 | B1 * | 11/2009 | Imig | 33/265 |
| 2005/0115089 | A1 * | 6/2005 | Johnson | 33/265 |
| 2006/0156560 | A1 * | 7/2006 | Lines et al. | 33/265 |
| 2010/0115778 | A1 * | 5/2010 | Gorsuch et al. | 33/265 |
| 2010/0258628 | A1 * | 10/2010 | Bay | 33/265 |
| 2012/0042863 | A1 * | 2/2012 | Smith et al. | 124/87 |
| 2012/0180367 | A1 * | 7/2012 | Singh | 124/87 |
| 2014/0144030 | A1 * | 5/2014 | Heaton et al. | 33/228 |

* cited by examiner

*Primary Examiner* — G. Bradley Bennett
(74) *Attorney, Agent, or Firm* — Ballard Spahr LLP

(57) ABSTRACT

Provided are devices for determining the correct aiming point of a low velocity projectile and methods and systems for using the devices. For example, the devices can be attached to a bow and used to improve accuracy for hunting game.

19 Claims, 10 Drawing Sheets

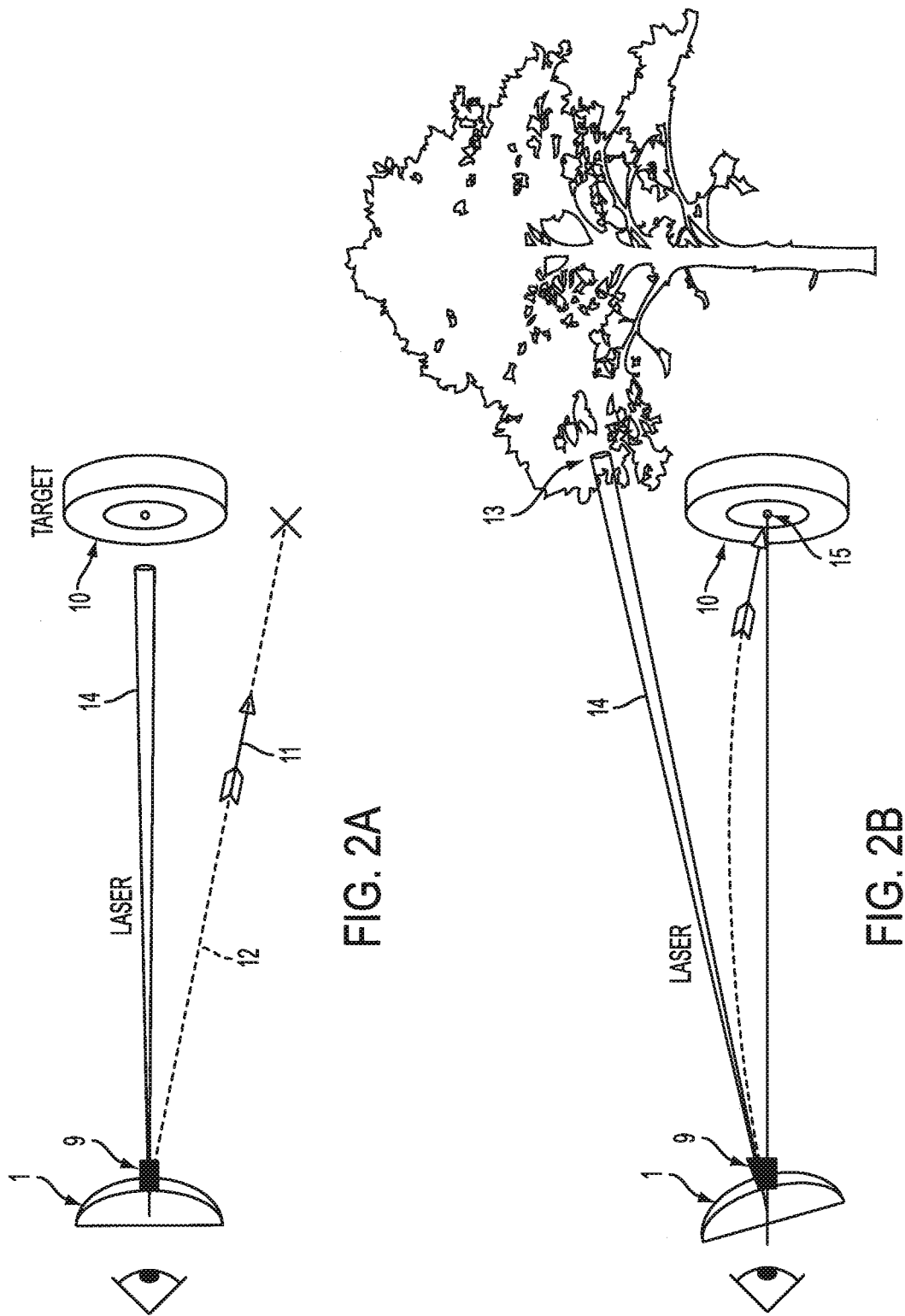

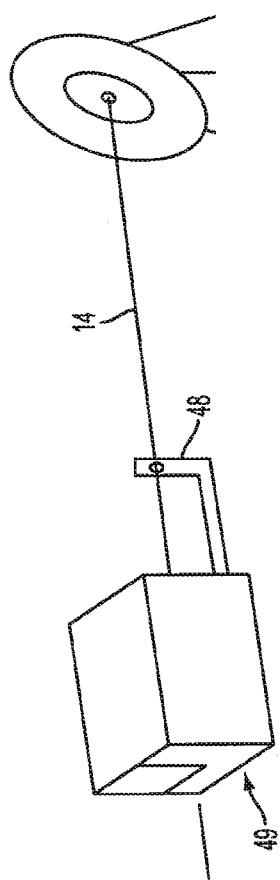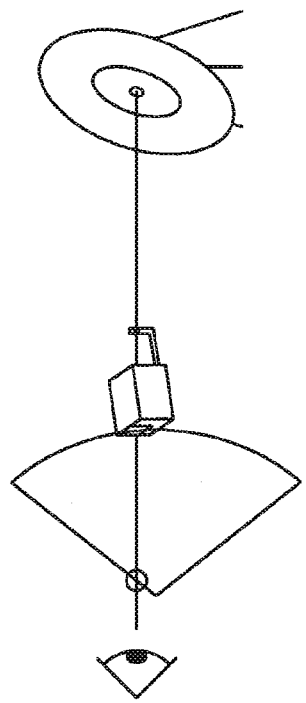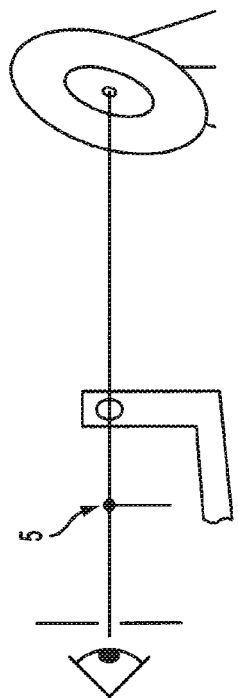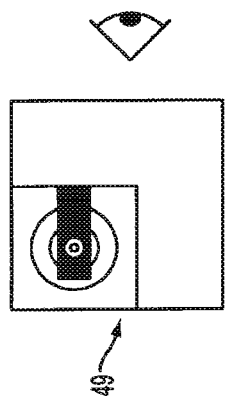
FIG. 9A  FIG. 9B  FIG. 9C

LOW VELOCITY PROJECTILE AIMING DEVICE

CROSS-REFERENCE TO RELATED APPLICATIONS

This application claims the benefit of U.S. patent application Ser. No. 12/826,391, filed on Jun. 29, 2010, which claims the benefit of U.S. Provisional Application No. 61/269,970, filed Jul. 1, 2009, which are both hereby incorporated by reference in their respective entireties as part of this application.

FIELD OF THE INVENTION

Implementations described herein relate generally to systems and methods for aiming and firing low velocity projectiles.

BACKGROUND

A major drawback of a low velocity projectile device like a bow is the parabolic trajectory of the projectile, requiring accurate distance and angle estimation, particularly at hunting or combat distances. For example, using a bow at a distance of 35 yards, a range estimation error of as few as two or three yards can cause a complete miss on a deer-size target. To further complicate matters, a downhill shot, for example one from an elevated tree stand or window, causes the projectile to fly higher than would be the case in a horizontal shot at the same distance. The same applies to an uphill shot. Skilled bowhunters develop their range-estimation ability through dedicated practice in field conditions, some shooting "instinctively", i.e. without the use of sights or even conscious range-estimation. This requires long hours of practice under varying conditions which is not practical for many hunters. In addition, to develop a high level of skills for combat applications of a low velocity projectile, a significant number of training rounds must be expended at a high cost in both training material and time.

Archery has been practiced by many nations for millennia. The principle of guiding an arrow accurately to a target has been used to provide sustenance, for sport, and in some cultures has attained a spiritual quality. The basic principles of archery have remained largely unchanged with respect to today's practice of archery.

Part of archery's allure is the difficulty required in attaining effective archery shooting skills. Many hours of discipline and practice can be required to accurately hit a still target. Still, even more discipline and skill can be required to hit a target in motion. Many archers who are proficient at hitting a still target can be ultimately unsuccessful when shooting at a moving target. The moving target requires that the archer mentally compute a ballistic solution that can include an estimation of a "lead" or an aim point slightly ahead of the moving target so that an arrow fired at one point in space reaches the aim point the same instant in time as the target. This leading or aiming skill can be desirable to effectively hunt and it must be practiced for the archer to become proficient. Much of this skill involves the archer developing a "sense" or skill at target motion estimation, determining target speed, and combining this "sense" with a familiarity with a bow and arrow. The velocity of an arrow is dependent upon the draw weight of the bow which the archer is shooting. The archer must know the velocity of the arrow at a given draw of the bow, or as in developing the leading skill, the archer must become very familiar with the archer's own equipment such that all variables in the ballistic calculation can be "sensed" or known by the archer. These "senses" can only be acquired with substantial practice and integration of the archer's physical and mental processes. This integration of mind and body is responsible for much of the enjoyment experienced by seasoned archers.

For simplicity, our discussion will focus on hunting applications although applicable to any low velocity projectile, such as the M-203 grenade launcher and other devices.

Simple sights have long been known for use with archery bows and other low velocity projectile weapons, i.e. those with an exit velocity below approximately 1000 fps. They range from simple pin markers to peep sights, to vertically aligned series of horizontal pins mounted in a generally annular frame to protect the pins. These latter multi-pin sights have proliferated in the last few years, especially in the hunting arena, where the distance to a target or target animal can vary as much as from 10 to 60 yards. In the bow hunting situation, the trajectory of an arrow must be accurately predicted if an archer is to have any confidence in accurate shot placement. Since the typical range to a target can vary substantially, it is critical that a good estimate of the distance for a particular shot be known with some degree of accuracy. The archer typically has to use a remote measuring device or physically measure the distance to an anticipated target location from the archer's tree stand, blind, or other shooting location. Alternatively he or she must simply guess as to the appropriate distance in order to compensate for the effects of gravity on an arrow in flight to the target. In the past, there have been few tools to aid the shooter in this endeavor.

One such tool has been a multiple position sight which can be a pin sight in the case of archery or a leaf sight in the case of a grenade launcher. Normal multi-pin sights simply have several brass aiming pins which stick out horizontally from a vertical frame mounted in front of the hand grip on the bow. Each pin can provide an aiming point from the shooters eye position useful for a particular target distance. The archer can visually estimate the appropriate range and then sight to the target using the appropriate aiming pin corresponding to that range. Recently an enhancement to the multi-pin sight has been introduced. This sight employs light gathering fiber optic filaments which can provide a self-powered illuminated dot that the archer sees at the end of each aiming pin. These fiber optic multiple pin sights can greatly improve the utility of such sights in low light or low contrast lighting situations.

Hand-held range-finding instruments exist and can offer one solution to the problem, but can be awkward to use and require extra movement at a time when any movement can be undesirable. Crude range estimation devices for hunting use are available, relying on spaced stadia wires subtending a set angle, which brackets an "average" deer's chest at certain specified distances, but these are not widely used owing to wide variations in body size within and between species. Neither aid corrects for differences in elevation between the target and the archer.

Sophisticated bow-mounted aids are known. Such aids fall into two main classes: the first comprises sights incorporating optical range-finders which measure the line-of-sight distance but not the angle of inclination or declination to the target while the second class relies on measurement of the angle of declination from an elevated shooting position but not the line-of-sight distance to the target.

Aids of the first type include U.S. Pat. No. 3,136,697 dated Dec. 29, 1964, claiming an optical range-finder based on a dual spaced mirror device and coupled sighting element; U.S. Pat. No. 2,788,701, dated Apr. 16, 1957, claiming the use of a multi-mirror device; U.S. Pat. No. 4,555,856, dated Dec. 3, 1985, claiming a third adjusting compensating mirror and cam-coupled sight pin; U.S. Pat. No. 4,646,444, dated Mar. 3, 1987, claiming a self-indicating planar/parabolic mirror combination; and U.S. Pat. No. 4,178,693 claiming a two-mirror, split image bowsight incorporating a cam-controlled alignment mechanism. All of these devices can be accurate only when the shot is approximately level, and where one or more sight components can be customized to the specific shooter, bow, and projectile. For example, the inventions described in the U.S. Pat. Nos. 4,178,693 and 4,555,856 patents must be customized by highly sophisticated mathematical modeling techniques or by trial and error. The invention described in the U.S. Pat. No. 4,646,444 patent is provided with means of adjustment relying on the deflection of a flexible, variable thickness mirror however it does not have precise horizontal aiming point providing suitable alignment with a particular spot on a nondescript target such as a deer.

The second class of aids can include U.S. Pat. No. 4,120,096 dated October 1978, claiming a pivoted sight whose position relative to the sight picture can be appropriately elevated as the bow tilts from the horizontal; U.S. Pat. No. 4,796,364, dated Jan. 10, 1989, claiming a dual sight comprising a pendulum sight for shooting from an elevated position and a multi-pin sight for use on level ground, each of which can be secured out of the archer's line-of-sight when not in use; U.S. Pat. No. 4,711,036, dated Dec. 8, 1987, claiming two versions of a pendulum-actuated sight; U.S. Pat. No. 4,325,190, dated Apr. 20, 1982 claiming a plurality of sights selectively illuminated according to the angle of declination of the bow via an electronic circuit incorporating a plurality of switches; and U.S. Pat. No. 4,400,887, dated Aug. 30, 1983, claiming a plurality of sights and a means for selectively causing one pin to be readily distinguishable from the others according to the angle of declination of the bow, via a pendulum-mounted colored lens positioned to selectively interrupt multiple fiber-optic cables. None of these devices can serve as a range-finding aid on level or upwardly sloping ground, nor can they function properly where the elevation of the archer relative to the target is unknown (for example where the elevated stand can be situated above sloping ground) or where the archer can be significantly above or below the restricted height range for which the sight can be calibrated. Furthermore, except for the precalibrated multi-pin sights of the U.S. Pat. Nos. 4,325,190 and 4,400,887 patents, all of these aids provide the same sight correction for all bow/shooter/projectile combinations. In practice, the vast majority of bow hunters shoot and hope for the best, resulting in a higher incidence of poor hits and lost game than would be the case if an accurate range-finding sight were used. Indeed, increasing controversy over the humaneness of the bow as a hunting weapon in the hands of the average hunter mandates the development of such a device.

Laser rangefinders are available and well known in the art (such as described in U.S. Pat. Nos. 6,108,071, 5,379,676, and 6,073,352 incorporated herein by reference) however they are usually separate devices that require separate movement and action to initiate in a time when seconds count. In addition, once the laser distance is determined, a visual estimate can be still required to interpolate between fixed pin positions.

To address the accuracy of range estimating, laser rangefinders have been developed and marketed by a variety of companies, including Laser Atlanta, Leica, Bushnell and Nikon among others. These rangefinders enable the determination of the distance to the target, however the archer still has to choose which of several sighting pins to align with the target based on the distance displayed or manually adjust the pin using the technique shown in U.S. Pat. No. 6,494,604 based on the distance determined so that the aiming pin represents the correct solution to the ballistics equation. For example, if the archer has preset the pins to distances of 10, 20, 30, 40, and 50 yards, the archer would choose the pin closest to the displayed target distance. In one model, the Bushnell laser rangefinder can be integral with the multiple pin sight. The entire sight can be removed from the bow and used as a hand held distance measurement device. In another example, the rangefinder can be modular and can be removed from the bowsight for use as a hand held distance measuring device.

One of the major disadvantages with the use of a rangefinder can be that it only indicates the range when aimed directly (i.e., via line of sight) at the target. Thus, after the range can be determined, the archer must raise the bow such that the appropriate distance pin of the bow sight can be aligned with the target. The archer can choose the incorrect pin with which to aim at the target, resulting in a missed shot. Another disadvantage can be that the rangefinder alone does not automatically compensate or adjust for the angle from which the shot is being fired. Another disadvantage can be the rangefinder alone can be very difficult to use with moving targets, especially targets running away from the archer or shooter or running toward the archer or shooter. Hunters often fire an arrow from an elevated position and in some instances fire upward at an angle. Hunting birds can require shooting at an angle at a moving target which could be very difficult. There can be also a need to record images of the target animal and several devices have been developed to include a camera on a bow, however none of those devices can be fully integrated with a sight device as described herein.

Therefore there is a need for an integrated bow sight that automatically compensates for the angle from which the projectile or arrow is being fired Therefore there is also a need for a versatile archery or low velocity sight which automatically tells the archer or shooter where to aim when aiming at a particular target so as to avoid the potential for missing the target. Because projectile velocity is critical to solving the ballistic equation, knowledge of arrow velocity is needed. This velocity can be measured prior to a hunt and stored, however changes in temperature and humidity and other factors can changes the arrow velocity, therefore there can be a need to predict arrow velocity based on conditions instant to the projectile launch and a need to measure actual arrow velocity as the arrow is fired and a need to store and update specific arrow velocities in each arrow so that minute differences in arrow speed can be included in the ballistic algorithm

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain the and exemplify certain concepts of the disclosure as an introduction to the following complete and extensive detailed description. One aspect of the present disclosure can be to provide a sight for low velocity projectile launching device that automatically adjusts an aiming point to the true aim point for a given target compensating for the low velocity projectile launching device ballistic characteristics, projectile ballistic characteristics, distance and height differences between the low velocity projectile launching device and the target. One other aspect of the present disclosure provides an integrated sight comprised of the following: movable aiming pin, a rangefinder, inclinometer, operator control mechanism, a true aim point compensation calculator and display of target distance that can be attached to a low velocity projectile launching device. The operator can aim at a target with the movable aiming pin in the line of sight (LOS) position and activate the operator control mechanism, the rangefinder can measure the distance, the inclinometer can measure the aiming angle, the display can display the range, the true aim point (TAP) compensation calculator LOS can position to the TAP position. The low velocity projectile launching device can then be fired by the operator.

A second preferred embodiment of the present disclosure can provide an integrated sight comprising the following: a movable illuminated ("red-dot") aiming point, a rangefinder, an inclinometer, an operator control mechanism, a true aim point compensation calculator and a display of target distance that can be attached to a low velocity projectile launching device. The operator can aim at a target with the movable aiming point in the LOS position and activate the operator control mechanism, the rangefinder can measure the distance, the inclinometer can measure the aiming angle, the display can display the range, the true aim point compensation calculator can calculate the TAP and can move the movable aiming point from the LOS position to the TAP position. The low velocity projectile launching device can then be fired by the operator.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

DESCRIPTION OF THE FIGURES

The accompanying drawings, which are incorporated in and constitute a part of this specification, illustrate aspects and together with the description, serve to explain the principles of the methods and systems.

FIG. 2A illustrates a first scene of an archer taking aim at a target animal showing the difference between the laser line of sight and the projectile aiming point.

FIG. 2B illustrates a second scene of an archer taking aim at a target animal showing the difference between the laser line of sight and the projectile aiming point.

FIG. 9A illustrates a view of a potential embodiment of the auxiliary sight used to align the sight to the low velocity projectile device.

FIG. 9B illustrates a second view of a potential embodiment of the auxiliary sight used to align the sight to the low velocity projectile device.

FIG. 9C illustrates a third view of a potential embodiment of the auxiliary sight used to align the sight to the low velocity projectile device.

DETAILED DESCRIPTION OF THE INVENTION

Figure 1A:
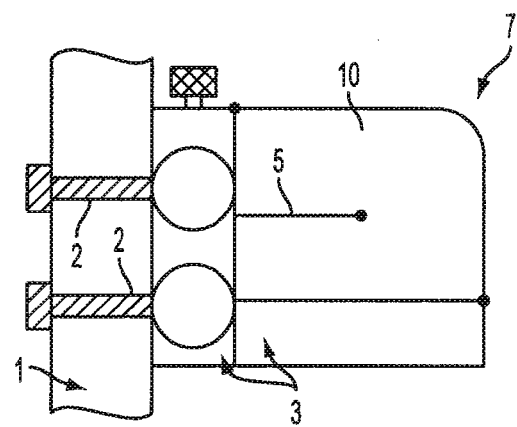
FIG. 1A illustrates a cross-sectional side view of one aspect of the aiming device of the present disclosure.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results described herein. It will also be apparent that some of the desired benefits described herein can be obtained by selecting some of the features described herein without utilizing other features. Accordingly, those who work in the art will recognize that many modifications and adaptations to the present invention are possible and can even be desirable in certain circumstances and are a part described herein. Thus, the following description is provided as illustrative of the principles described herein and not in limitation thereof.

Reference will be made to the drawings to describe various aspects of one or more implementations of the invention. It is to be understood that the drawings are diagrammatic and schematic representations of one or more implementations, and are not limiting of the present disclosure. Moreover, while various drawings are provided at a scale that is considered functional for one or more implementations, the drawings are not necessarily drawn to scale for all contemplated implementations. The drawings thus represent an exemplary scale, but no inference should be drawn from the drawings as to any required scale.

In the following description, numerous specific details are set forth in order to provide a thorough understanding described herein. It will be obvious, however, to one skilled in the art that the present disclosure may be practiced without these specific details. In other instances, well-known aspects of systems and methods for aiming and firing low velocity projectiles have not been described in particular detail in order to avoid unnecessarily obscuring aspects of the disclosed implementations.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another aspect can include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Optional" or "optionally" means that the subsequently described event or circumstance may or may not occur, and that the description can include instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be perdefined it is understood that each of these additional steps can be perdefined with any specific aspect or combination of aspects of the disclosed methods.

Reference will now be made to the drawings to describe various aspects of one or more implementations of the invention. It is to be understood that the drawings are diagrammatic and schematic representations of one or more implementations, and are not limiting of the present disclosure. Moreover, while various drawings are provided at a scale that is considered functional for one or more implementations, the drawings are not necessarily drawn to scale for all contemplated implementations. The drawings thus represent an exemplary scale, but no inference should be drawn from the drawings as to any required scale.

In the following description, numerous specific details are set forth in order to provide a thorough understanding described herein. It will be obvious, however, to one skilled in the art that the present disclosure may be practiced without these specific details. In other instances, well-known aspects of systems and methods for aiming and firing low velocity projectiles and the like have not been described in particular detail in order to avoid unnecessarily obscuring aspects of the disclosed implementations.

The present disclosure comprises a sight which not only allows the accurate estimation of range, but also indicates which aiming point to use, taking into account a variety of factors which include but are not limited to deviations from the horizontal, arrow velocity, arrow speed, angular velocity and range, atmospheric and environmental conditions, limb strain or other similar energy storage measurement. In addition, a camera can be integrated which provides a visual record of the scene at the instant of the shot which could be activated by the shock and vibration of the projectile launch. The device can measure the distance and angle to the target, indicating the appropriate aiming point by means of an indicator that has a position that can be automatically adjusted. The range-finding mechanism can be hand or finger operated or activated by other techniques allowing the hunter to draw, estimate, aim, and release in one fast, fluid movement. Finally, the sight can be designed to attach to the standard bushings or mounts provided by manufacturers, allowing easy installation without special tools.

One aspect of the present disclosure can include an integrated aiming device for a projectile launching device comprising a means of measuring distance, an aiming point adjustable in one or more axis and a means of determining the true aim point (TAP). The device could further include: a one or more axis inclination, an acceleration measuring device where the distance measuring can be an electronic rangefinder, where the adjustable aiming point can be one or more movable pins or light sources, where the adjustable aiming point can be adjustable via a movable mirror, where the adjustable aiming point can be adjustable via display of one or more powered or unpowered light sources, where the aiming point can be adjusted in two axes, that can be low cost and lightweight, that can include a means of attaching to the projectile launching device and that can be battery powered. The present disclosure can also include: a device and method for displaying an adjustable aiming point by moving one or more light sources and device and method for displaying an adjustable aiming point by tilting a reflective surface. The present disclosure can include a method for displaying an adjustable aiming point by changing the spectral output of a light source The present disclosure can include method for displaying an adjustable aiming point by activating a bimetallic or other shape changing material.

The present disclosure can include a device for displaying the correct aiming point for a projectile launching device comprising a processor for calculating the correct aiming point of the projectile launching device using one or more of the following information: range, projectile characteristics, environmental characteristics, launcher characteristics, one or more axis inclinometer output, elevation measurement, relative wind velocity, wind direction and temperature. The present disclosure can include a means for displaying a line of sight (LOS) aiming point suitable for aligning a rangefinder with a target and displaying the true aiming point for the projectile launching device.

The present disclosure can include a method of operating the system described herein comprising operation of a control device which selects from displaying the LOS aiming point or the true aiming point. The present disclosure can include a method of operating the system described herein comprising operation of a control device which actives the ranging device and displays the LOS aiming point when the control device can be activated and deactivates the ranging device and/or the LOS aiming point when deactivated.

The present disclosure can include a method of allowing the visual identification of the LOS and true aiming points by differences in color, shape or modulation.

The present disclosure can include a method of calculating the position of an adjustable aiming point for a projectile comprising calculating the elevation of the launch point, the inclination and the speed of the projectile. Suitable equations for making these calculations can be found in the ballistics program: BALLISTIC v4.13, Copyright 1988-1995, William R. Frenchu or in Modern Exterior Ballistics: The Launch and Flight Dynamics of Symmetric Projectiles by Robert L. McCoy which are both incorporated herein by reference.

Sensors such as strain sensors can be placed on the limbs of the bow or integrated into the bow string so that an indication can be made of the stored energy and used in calculating the resultant velocity of the projectile. One example of a suitable strain sensor is described in United States Patent Application Publication Number 20070068270 which is hereby incorporated herein by reference.

Optionally, a camera that could be activated by the firing of the projectile by using one of several possible sensors can be placed into the system so that a visual record of the arrow impact can be made. Information from environmental sensors that measure the temperature, altitude and humidity can be employed to provide additional information for use in an algorithm.

The present disclosure can include a method of storing historical velocity information in the arrow or in the memory of the device described herein. The system can obtain the information from the projectile or simply identify the projectile itself by means of a device such as an RF chip or a bar code or other suitable means and look up its previously stored velocity information and communicating this information to the system or device described herein in order to more accurately calculate the aiming point. The present disclosure can include a method of measuring the velocity of a projectile by placement of two or more points on the projectile (such as a bar code) which can be detected as they pass a fixed point in order to measure the transit time of the marks (by means of an IR transmit/receive pair) and knowing the time interval through the microprocessor or clock), calculate the velocity of the projectile just launched. The present disclosure can include a method for transmitting or storing the calculated velocity and a unique identifier to the projectile as it leaves the system (by transmitted RF) so that information can be stored on the projectile or in system memory and used the next time that projectile is launched.

Figure 10:
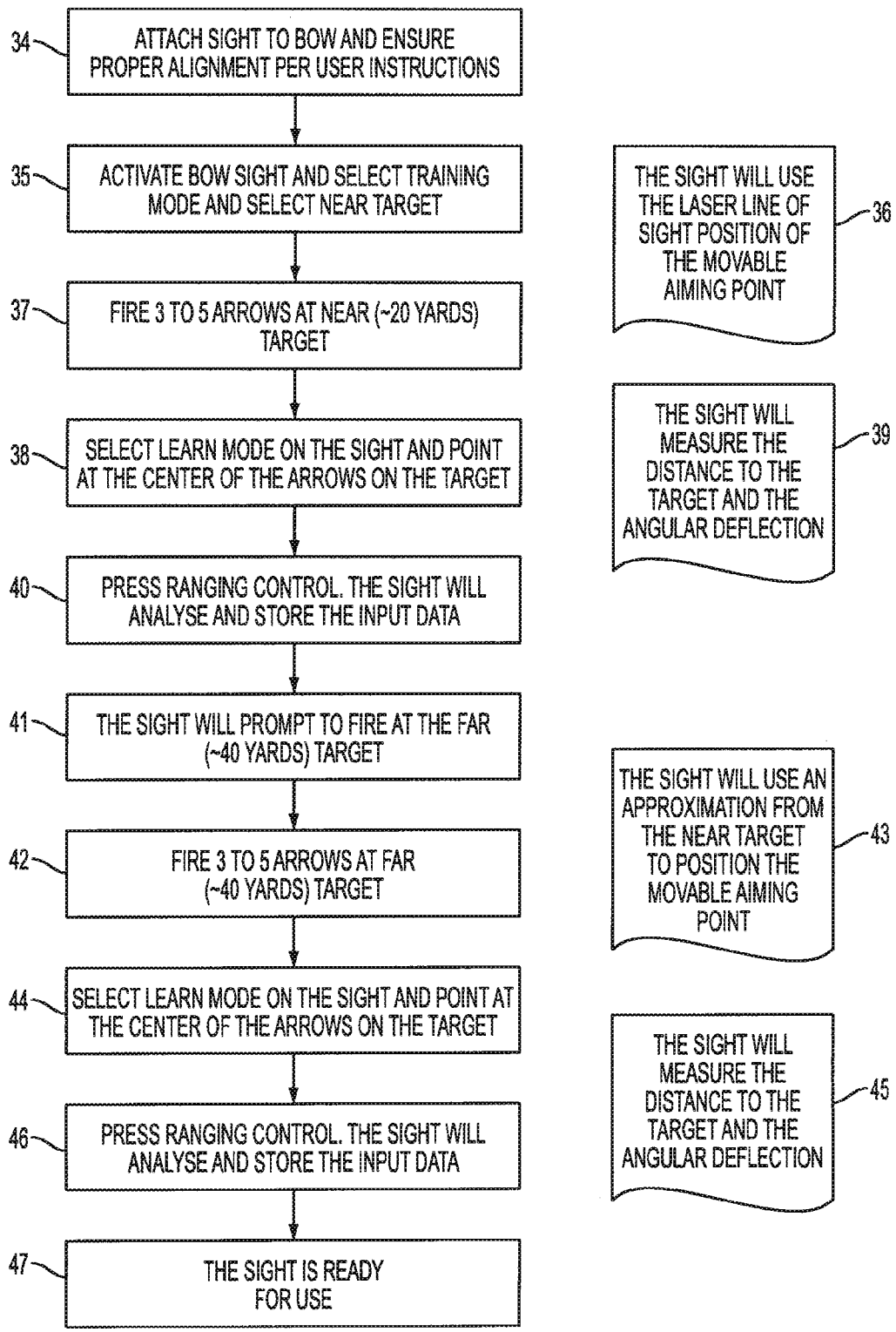
FIG. 10 illustrates a flowchart that illustrates the training sequence to determine the ballistic coefficients of the low velocity projectile launching device from a predetermined training sequence.

The flow chart depicted in FIG. 10 illustrates one exemplary aspect of a training sequence to determine the ballistic coefficients of the low velocity projectile launching device from a predetermined training sequence.

The first step 34 of the training sequence comprises mounting and aligning the sight to the low velocity projectile device.

The next step 35 comprises activating the sight, select a near target and select the training mode on the sight.

The next step 37 comprises firing 3 to 5 projectiles at the near target. The near target can be located approximately 20 yards from the sight. For the near target the sight can employ the laser line of sight position of the movable aiming pin per step 36. The sight can measure the distance and pointing angle to the target.

The next step 38 comprises pointing the sight at the center of the previously fired arrows and to activate the learn mode. The sight can derive ballistic coefficients from the position of the arrows relative to the aim point such as distance to the target and angular deflection 39. The user can press ranging control to initiate the sight to analyze and store the input data according to step 40.

The next step 41 comprises firing 3 to 5 projectiles at the far target. The far target can be located approximately 40 yards from the sight. For the far target the sight can employ an approximation of the TAP for the movable aiming pin. The sight can measure the distance and pointing angle to the target according to step 43.

The next step 44 comprises pointing the sight at the center of the previously fired arrows on the far target and to activate the learn mode.

It is contemplated that the sight can derive ballistic coefficients from the position of the arrows relative to the aim point such as distance to the target and angular deflection 45. The user can press ranging control to initiate the sight to analyze and store the input data according to step 46. The sight can be ready to use per step 47.

Figure 1B:
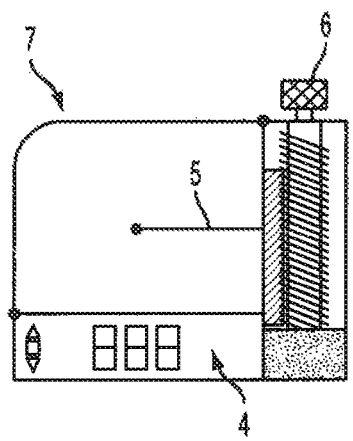
FIG. 1B illustrates a partial cut away side view of one aspect of the aiming device of the present disclosure.
Figure 1C:
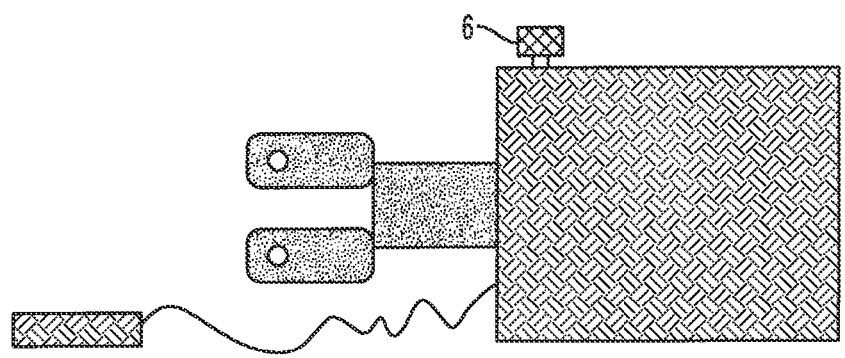
FIG. 1C illustrates a side view of one preferred embodiment of the present disclosure mounted to a bow.

The drawings shown in FIGS. 1A-1C depict a device according to the present disclosure and its relationship to the bow 1 to which the device can be attached by means of screws 2 passing through holes in the mounting mechanism which can be attached to the housing. The housing can comprise either a single or multiple enclosure(s) 3 to house the elements of the distance-measuring device, the display 4, control electronics, power elements, and the movable pin. The moveable pin mechanism can move the moveable aiming pin 5 either automatically or manually by means of thumbscrew 6 in case of electronic failure. The housing can also have a viewing path 10 through which the operator views the target that can be superimposed with the movable pin 5. A housing 7 around the viewing path can be used to protect the movable pin 5. The display 4 displays the range to the target measured by the distance measuring device 8.

FIG. 2A illustrates the geometric relationship of the targeting problem using a laser rangefinder 9 with a laser beam 14 with a bean divergence of 3 to 4 milliradians producing a spot size 1" on a 12 inch diameter target 10 at 40 yards and with a desired strike zone diameter of 3'. The laser can be positioned on the target 10 but the low velocity projectile (arrow) 11 can miss the target strike zone by several feet due to the nature of the ballistic path 12 of the projectile. FIG. 2B shows the laser spot 13 positioned above the target 10 where it hits a tree and produces an incorrect range and the movable aiming pin 5 positioned at the TAP 15 superimposed on the target setting the bow at the correct angle to have the projectile hit the target in the desired strike zone. Thus it can be shown that for a low velocity projectile, a laser rangefinder cannot be positioned on a typical target at the same time the TAP is positioned on the target.

Figure 3A:
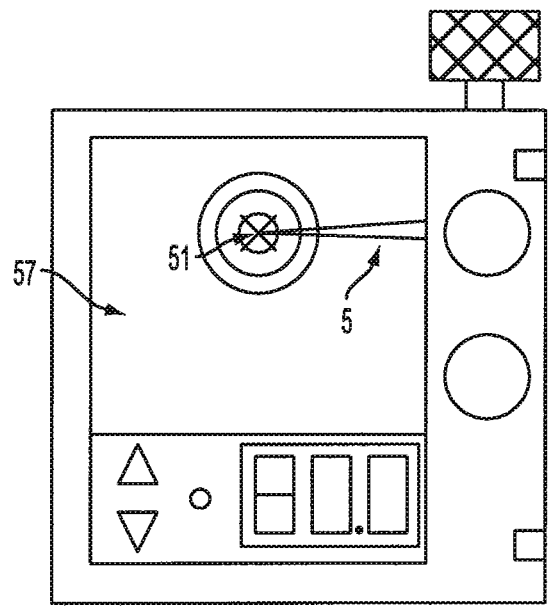
FIG. 3A illustrates a user's view of one preferred embodiment of the present disclosure showing the aiming points displayed on a target animal.
Figure 3B:
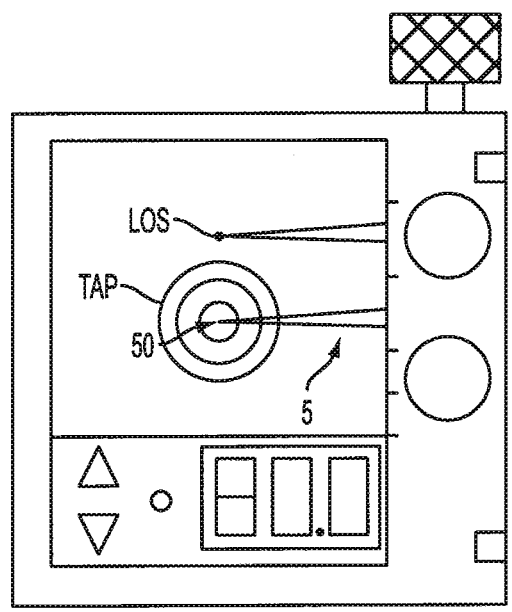
FIG. 3B illustrates a user's view of one preferred embodiment of the present disclosure showing the aiming points displayed on a target animal.

FIG. 3A shows the same situation as in FIG. 2A as seen through the viewing tunnel 57 of a device of the present disclosure. In the top view, the movable aiming pin 5 can be in the laser line of sight aiming position (LOP) 51, and can be shown with the laser rangefinder aligned to the target. In FIG. 3B, the movable aiming pin 5 can be positioned at the TAP position 50. The TAP has been calculated by the true aim point compensation calculator (TACC) and the movable aiming pin 5 moved to the TAP 50 which requires the user to elevate the bow angle until the TAP 50 can be positioned on the target and fire the weapon.

Figure 4A:
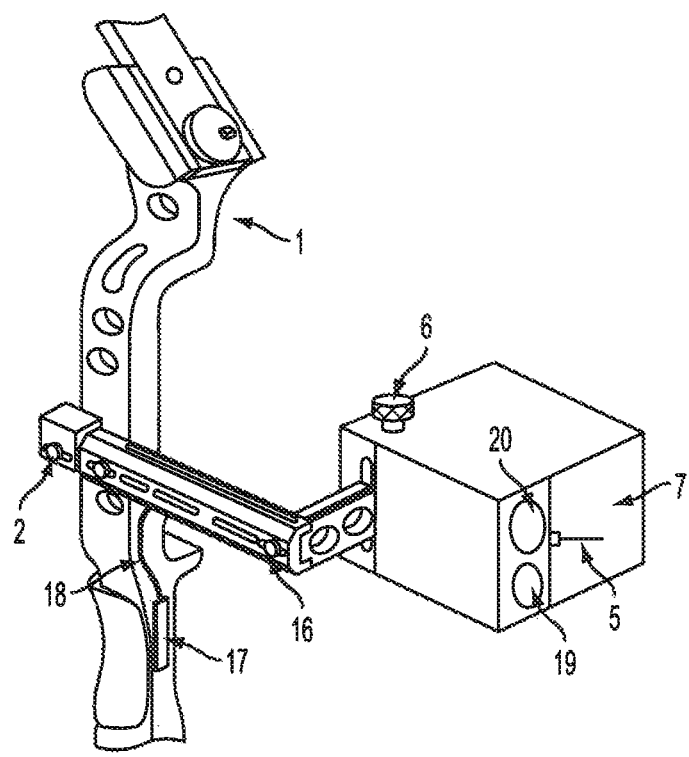
FIG. 4A illustrates a perspective view of one preferred embodiment of the present disclosure mounted to a bow in accordance with the present disclosure.
Figure 4B:
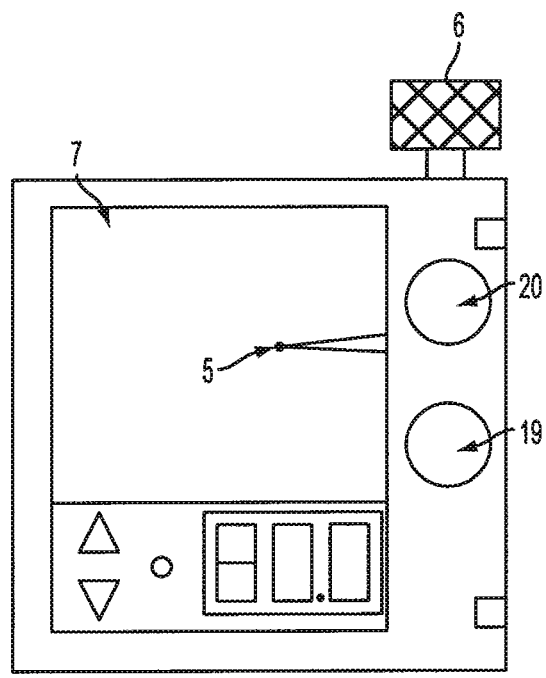
FIG. 4B illustrates a user's view of one preferred embodiment of the present disclosure.

FIGS. 4A-4B show one aspect of a device of the present disclosure mounted by means of an adjustable mounting bracket 16 and screw 2 to a modern archery bow 1. A pressure sensitive switch operable by the user 17 can be shown attached to the bow handle and connected to the housing via a wire 18. The manual pin adjustment knob 6 can be shown at the top of the housing. The front of the housing on the side opposite the arrow shows a transmit 19 and receive lens 20 aperture for a laser rangefinder. The aiming tunnel 7 can be shown with movable aiming pin 5.

Figure 5:
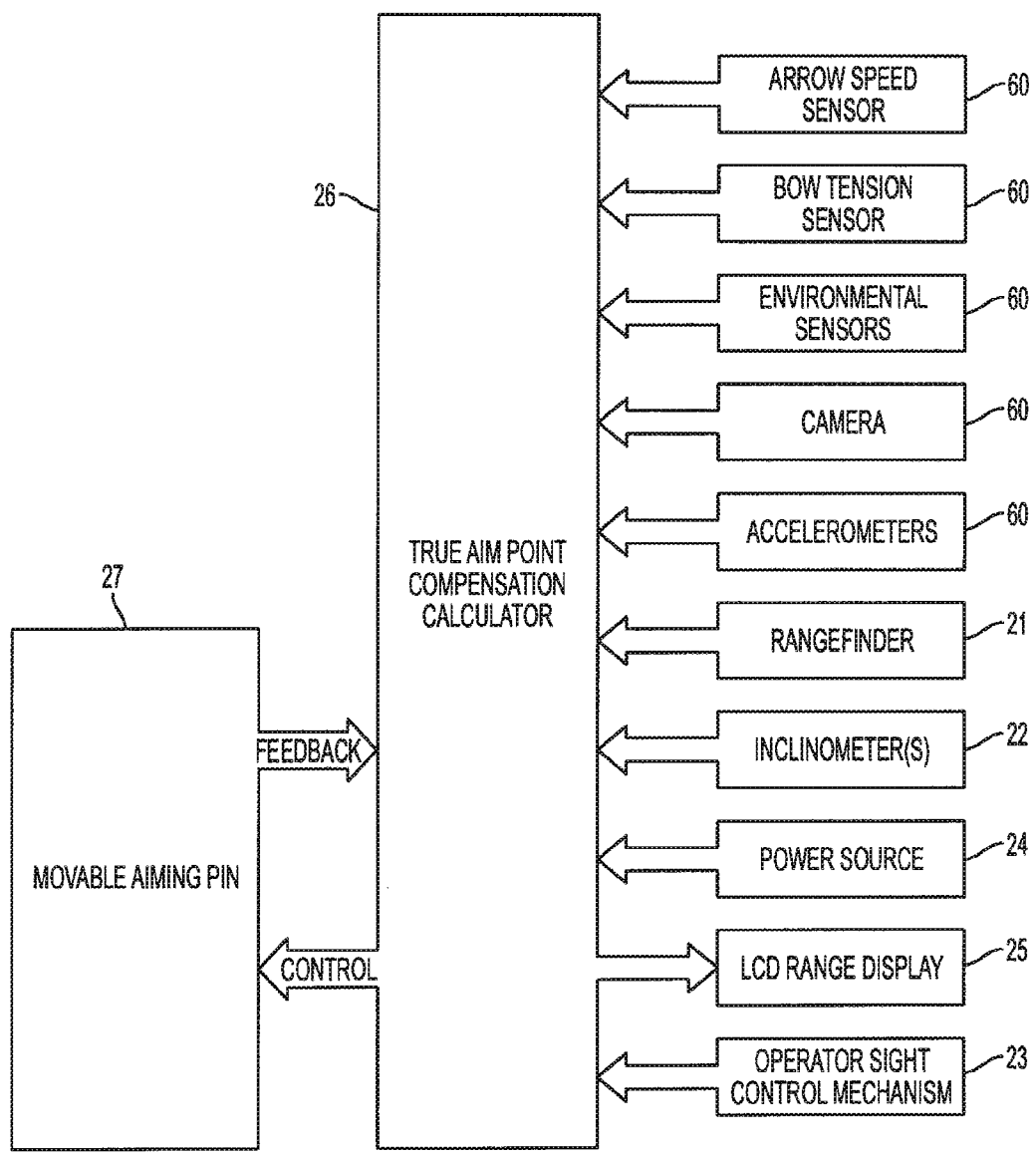
FIG. 5 illustrates an electronic block diagram of the apparatus in accordance with the present disclosure.

FIG. 5 shows a system block diagram detailing the components of one embodiment of the system. The block diagram shows a rangefinder 21 that can provide distance information, an inclinometer 22 that can provide one or more axis of angular information and a user input mechanism 23 that can provide user information. Optionally, any of a number of sensors 60 (such as an accelerometer, a camera, environmental sensors, strain sensors and arrow speed sensor) can be employed to provide additional information for use in an algorithm. This information can be provided to the true aim-point compensation calculator (TACC) 26. The TACC 26 can employ the information and one of many ballistic trajectory algorithms known to those skilled in the art to determine the angle at which the projectile must be fired in order to hit the target. This information can be sent to the movable aiming pin mechanism 27 to adjust the position of the movable aiming pin. The movable aiming pin mechanism 27 can provide feedback of its true position to the TACC 26 to insure the TAP can be in the correct position. The TAP can be adjusted manually by means of the manual control knob 6 in the event of unit failure. Power can be supplied to the system by the power source 24. The line of sight distance information can be displayed to the user by the LCD Range Display 25.

Figure 6:
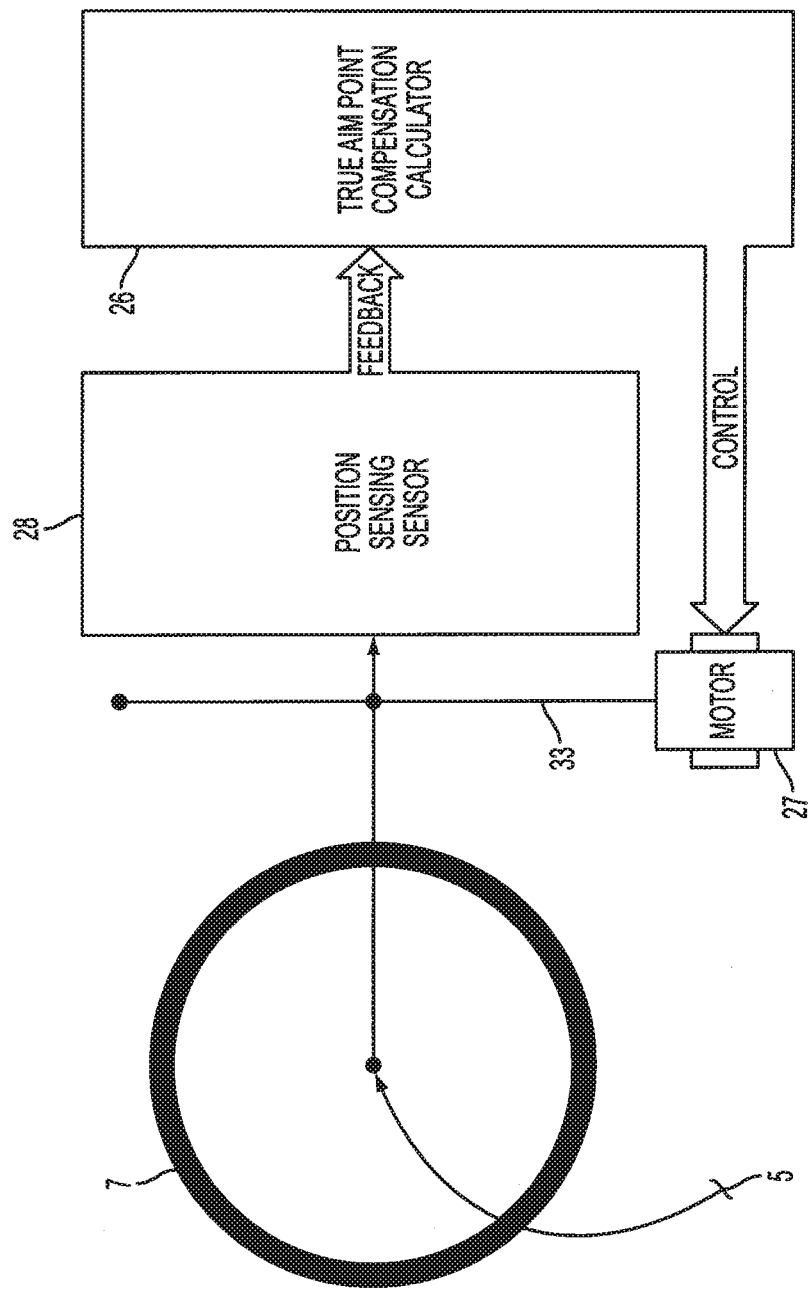
FIG. 6 illustrates a schematic view of the aiming point moving mechanism using one preferred embodiment in accordance with the present disclosure.

FIG. 6 shows a block diagram of the components of one exemplary aspect. The movable aiming pin 5 can be mechanically linked 33 to a motor 27 that can drive the position of the movable aiming pin 5 to any position within the optional sighting tunnel 7. The TACC 26 can control the position of the movable aiming pin 5 by means of an electrical drive signal to the motor 27. A feedback mechanism 28 can be connected to the movable aiming pin 5 to provide true position information to the TACC 26.

Figure 7:
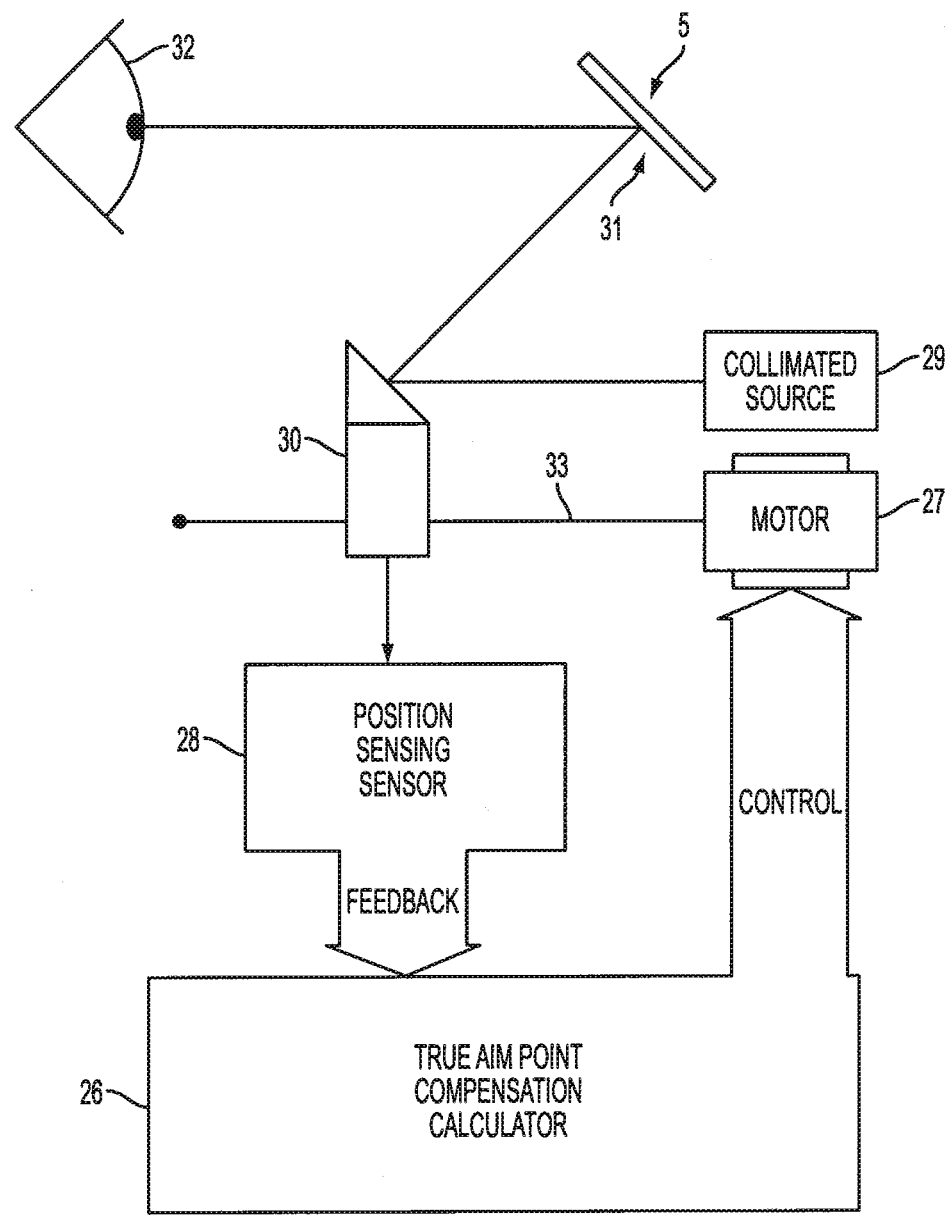
FIG. 7 illustrates an optical schematic block diagram of a second embodiment showing the aiming point moving mechanism.

FIG. 7 shows a block diagram of the components of one exemplary aspect. In this embodiment the movable aiming pin 5 can be a beam of collimated light 29 that can be relayed to the operator's eye 32 by means of one or more reflecting surfaces 30, 31. The position of one or more of the reflective surfaces 30, 31 can be modified by one or more motors 27. The reflective surfaces can be mechanically linked 33 to a motor(s) 27 that can drive the position of the movable aiming pin 5 to any position within the Sighting Tunnel 7. The TACC 26 controls the position of the movable aiming pin 5 by means of an electrical drive signal to the motor 27. A feedback mechanism 28 can be connected to the movable aiming pin 5 to provide true position information to the movable aiming pin 5.

Figure 8:
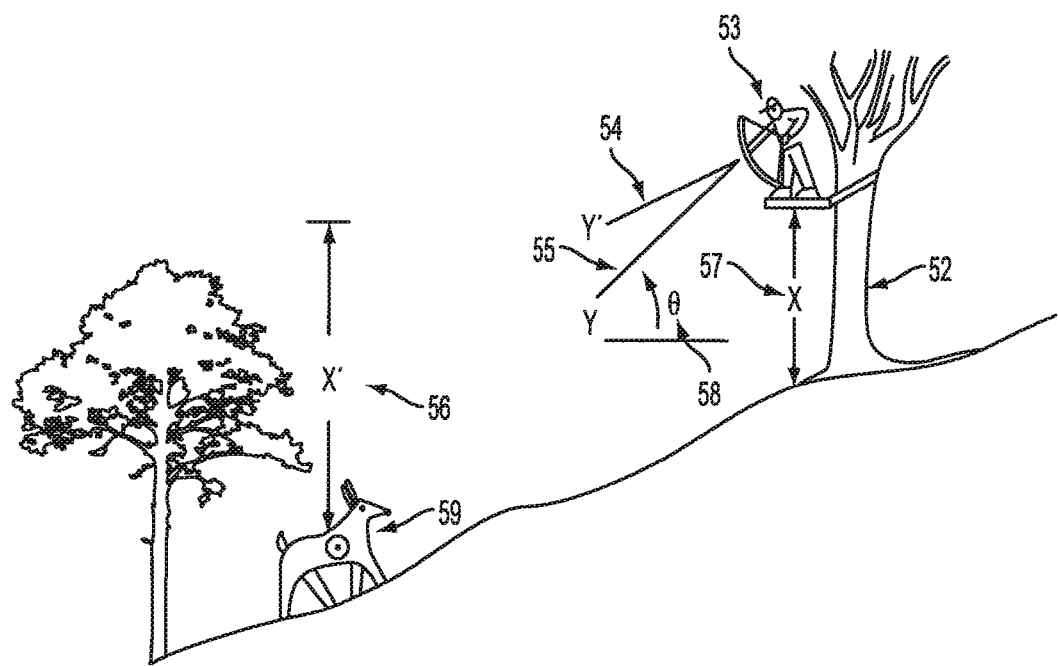
FIG. 8 shows the varying terrain expected to be found in a typical hunting situation with factors to be considered in determining the aiming point.

FIG. 8 shows the varying terrain expected to be found in a typical hunting situation. The hunter 53 can be in a tree stand with an elevation X 57 above the earth. The target animal 59 can be standing on sloped ground below the tree stand at a distance Y 55 and angle θ 58 from the hunter and various obstructions are apparent. The target animal 59 can be a distance X' 56 below the hunter 53 and the path that the projectile will actually take can be Y' 54.

The system of the present disclosure can take one or more of these factors into account in determining the correct aiming point, FIGS. 9A-9C illustrate a view of a potential embodiment of the auxiliary sight 48 used to align the sight 49 to the low velocity projectile device. The auxiliary sight 48 and the movable aiming pin 5 in the laser line of sight position can be aligned at the factory such that the auxiliary sight and movable aiming pin can be precisely aligned along the laser path. Thus by aligning the low velocity projectile device to the auxiliary sight to the movable aiming pin in the laser line of sight position the sight can be aligned with the low velocity projectile device.

It can be thus seen from the preceding description that the various elements of the present disclosure function together as an intelligent sighting device which can not only allow the operator to measure the line-of-sight distance to a target, but can also provide a highly visible indication of the proper angular correction for the trajectory of the arrow, automatically compensating for deviations in the angle of the shot from the horizontal. It is contemplated that the mathematical principle upon which this correction can be based can be universal to combinations of shooting style and equipment, allowing economical mass-production of the device.

The present invention can thus be embodied in other specific forms without departing from its spirit or essential characteristics. The described aspects are to be considered in all respects only as illustrative and not restrictive. The scope of the invention is, therefore, indicated by the appended claims rather than by the foregoing description. All changes that come within the meaning and range of equivalency of the claims are to be embraced in their scope.

What is claimed is:

1. An integrated aiming device for a projectile launching device comprising:
a means of measuring distance; a line of sight (LOS) aiming point; a true aiming point adjustable in one or more axis and a means of determining the true aim point.

2. The aiming device of claim 1, wherein the true aim point is determined by taking into account two or more factors selected from (1) deviation from the horizontal, (2) projectile velocity, (3) projectile speed, (4) angular velocity, (5) range, (6) atmospheric and environmental conditions, (7) limb strain or other similar energy storage measurement.

3. The aiming device of claim 1, wherein the control device activates the ranging device and displays the LOS aiming point when the control device is activated and activates true aiming point when deactivated.

4. The aiming device of claim 1, wherein the line of sight (LOS) aiming point and the true aiming points are made visually identifiable using differences in one or more of color, shape, modulation.

5. The aiming device of claim 1, wherein the adjustable aiming point is displayed by activating a bimetallic or other shape changing material.

6. The aiming device of claim 1, further comprising sensors integrated into the projectile launching device or projectile, said sensors used to provide information useful for calculating the true aim point.

7. The aiming device of claim 6, wherein the velocity of the projectile is calculated using the stored energy estimation.

8. The aiming device of claim 1, further comprising a camera.

9. The aiming device of claim 8, wherein the camera is activated by the projectile launch.

10. The aiming device of claim 1, further comprising a one or more axis inclinometer.

11. The aiming device of claim 1, further comprising an accelerometer.

12. The aiming device of claim 1, wherein the adjustable aiming point is adjustable via a movable mirror.

13. The aiming device of claim 1, wherein the adjustable aiming point is adjustable via display of one or more powered or unpowered light sources.

14. The aiming device of claim 1, wherein the aiming point can be adjusted in one or more axes.

15. A method for sighting comprising the steps of: displaying a line of sight (LOS) aiming point suitable for aligning a rangefinder with a target and also displaying the true aiming point for the projectile launching device.

16. The method of claim 15, further comprising: using a processor to calculate the correct aiming point of the projectile launching device using one or more of the following information: range, projectile characteristics, environmental characteristics, launcher characteristics, one or more axis inclinometer output, elevation measurement, relative wind velocity, wind direction, acceleration, temperature; and indicating the result of the calculation by adjusting the indication of true aiming point.

17. An aiming device for a projectile launching device comprising: a means for obtaining information from the projectile; a means for storing information retrieved from the projectile; and a means for using the information in the true aiming point calculation.

18. The aiming device of claim 17, further comprising a detector for measuring the velocity of a projectile.

19. A method for training an aiming device to determine the ballistic coefficients of the low velocity projectile launching device from a predetermined training sequence as follows comprising the steps of:
   mounting and aligning the sight to the low velocity projectile device;
   activating the sight and select the training mode;
   firing one or more projectiles at one or more near targets;
   pointing the sight at the center of the previously fired projectiles;
   activating the sight's learn mode to derive ballistic coefficients from the position of the projectiles relative to the aim point;
   firing one or more projectiles at the far target;
   pointing the sight at the center of the previously fired projectiles; and
   activating the learn mode.

* * * * *